US007141255B2

(12) United States Patent
Glassberg et al.

(10) Patent No.: US 7,141,255 B2
(45) Date of Patent: Nov. 28, 2006

(54) FOOD FORMULATIONS

(75) Inventors: Debbie Glassberg, Manhattan Beach, CA (US); Cheryl Lillienthal, Woodland Hills, CA (US); Debbie L. Lohmeyer, San Jose, CA (US); Julene A. Mrzywka, Pleasanton, CA (US); Theodore R. Herrera, Pleasanton, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/698,912

(22) Filed: Oct. 31, 2003
(Under 37 CFR 1.47)

(65) Prior Publication Data
US 2004/0253350 A1 Dec. 16, 2004

Related U.S. Application Data

(60) Provisional application No. 60/422,936, filed on Nov. 1, 2002.

(51) Int. Cl.
*A23G 9/00* (2006.01)
*A23L 2/00* (2006.01)
*A23B 4/06* (2006.01)

(52) U.S. Cl. .................. 426/112; 426/94; 426/590; 426/565; 426/660; 426/506

(58) Field of Classification Search .............. 426/94, 426/128, 555, 112, 590, 565, 660, 506
See application file for complete search history.

(56) References Cited

U.S. PATENT DOCUMENTS

| | | | |
|---|---|---|---|
| 2,772,171 A * | 11/1956 | Montminy | 426/554 |
| 2,785,982 A * | 3/1957 | Weaver et al. | 426/661 |
| 3,368,063 A * | 2/1968 | Kuhn | 219/411 |
| 3,393,074 A * | 7/1968 | Ehrlich | 426/94 |
| 3,409,442 A * | 11/1968 | Finucane et al. | 426/555 |
| 3,548,146 A * | 12/1970 | Hoyland | 219/200 |
| 3,615,718 A * | 10/1971 | Weinstein | 426/116 |
| 3,808,730 A * | 5/1974 | Cooper et al. | 446/481 |
| 3,862,341 A | 1/1975 | Johannes | |
| 3,875,309 A | 4/1975 | Johanes | |
| 4,100,308 A * | 7/1978 | Gawrilow | 426/554 |
| 4,163,806 A | 8/1979 | Callen et al. | |
| 4,201,794 A | 5/1980 | Sumitani | |
| 4,206,244 A | 6/1980 | Schenk | |
| 4,281,111 A * | 7/1981 | Hunt et al. | 536/111 |
| 4,401,685 A | 8/1983 | Brown et al. | |
| 4,407,836 A | 10/1983 | Bosco et al. | |
| 4,409,255 A | 10/1983 | Danielson et al. | |
| 4,427,709 A | 1/1984 | Guhl et al. | |
| 4,430,350 A | 2/1984 | Tresser | |
| 4,476,145 A | 10/1984 | Hardie-Muncy et al. | |
| 4,515,824 A * | 5/1985 | Blake et al. | 426/554 |
| 4,588,602 A | 5/1986 | Brown et al. | |
| 4,594,255 A | 6/1986 | Wilson et al. | |
| 4,615,896 A | 10/1986 | Brown et al. | |
| 4,615,897 A | 10/1986 | Brown et al. | |
| 4,615,898 A | 10/1986 | Brown et al. | |
| 4,623,549 A | 11/1986 | Katt et al. | |
| 4,664,927 A | 5/1987 | Finkel | |
| 4,732,772 A | 3/1988 | Nolte | |
| 4,746,527 A | 5/1988 | Kuypers | |
| 4,812,318 A | 3/1989 | Finkel | |
| 4,853,235 A | 8/1989 | Tomomatsu | |
| 4,876,106 A * | 10/1989 | Sabatura | 426/583 |
| 4,919,958 A * | 4/1990 | Kadan et al. | 426/573 |
| 4,980,192 A | 12/1990 | Finkel | |
| 5,215,774 A * | 6/1993 | Moder et al. | 426/243 |
| 5,246,727 A | 9/1993 | Finkel | |
| 5,250,316 A | 10/1993 | Harris | |
| 5,314,373 A | 5/1994 | Caveza et al. | |
| 5,545,410 A * | 8/1996 | Fox et al. | 424/439 |
| H1620 H * | 12/1996 | Dolan et al. | 426/593 |
| 5,597,603 A * | 1/1997 | Cha et al. | 426/573 |
| 5,738,900 A * | 4/1998 | Cuadrado et al. | 426/658 |
| 5,783,239 A | 7/1998 | Callens et al. | |
| 5,853,785 A | 12/1998 | Nayyar et al. | |
| 5,888,563 A * | 3/1999 | Mehansho et al. | 426/72 |
| 5,958,481 A | 9/1999 | Hodges | |
| 6,231,901 B1 | 5/2001 | Sharkasi et al. | |
| 6,372,272 B1 * | 4/2002 | Honoosic | 426/113 |
| 6,465,032 B1 | 10/2002 | Hollar | |
| 6,479,069 B1 * | 11/2002 | Hamilton | 424/439 |
| 6,565,901 B1 * | 5/2003 | Hembling et al. | 426/96 |

FOREIGN PATENT DOCUMENTS

| | | | |
|---|---|---|---|
| EP | 0 619 081 | * | 10/1994 |
| EP | 1240828 | | 9/2002 |
| GB | 1105922 | | 3/1968 |
| JP | 58020151 | * | 2/1983 |
| JP | 8154567 | | 6/1996 |
| WO | WO 2004/041394 | * | 5/2004 |

OTHER PUBLICATIONS

Product Alert, vol. 29, No. 2, Elzer Backwaren No Bake Cake Mix.
Walton Dehydrated Mixes, http://waltonfeed.com/, copyright 2001, printed Apr. 2002.
Dehydrated Foods from Backpacker's Pantry and REI, http://www.rei.com/, printed Apr. 2002.
The F.U.N. Place Recipe Box Archives, "Easy Bake Oven Recipes", www.funplace.com, posted by D. Godfrey on Apr. 8, 1999, pp. 1-3.
Jell-O No Bake Desserts, http://www.kraftfoods.com/jello/jlo_family_nobakes.html/ printed Apr. 2002.
AlpineAire Foods, http://www.alpineairefoods.com/, printed Apr. 2002.

\* cited by examiner

*Primary Examiner*—N. Bhat
(74) *Attorney, Agent, or Firm*—Kolisch Hartwell, P.C.

(57) ABSTRACT

Food formulations suitable for preparation by young children, requiring only the addition of water, that produce simulated foods that exhibit substantially appropriate textures and flavors.

18 Claims, No Drawings

FOOD FORMULATIONS

This application is based upon and claims benefit under 35 U.S.C. § 119(e) of U.S. provisional patent application Ser. No. 60/422,936, filed Nov. 1, 2002.

TECHNICAL FIELD

The invention relates generally to food product formulations, and more particularly to food products prepared by the addition of water to a formulation.

BACKGROUND

Young children particularly enjoy play that models adult activity. Such play behavior may include driving toy vehicles, using toy tools, and cooking activity. Such play behavior must generally be carefully monitored to prevent injury and render the play relatively uncomplicated, particularly for younger children. For example, although power tools used in such play may be designed to resemble a drill, a saw, etc., they are carefully designed to have no sharp edges, and no moving parts that can pinch skin, pull hair, or otherwise injure a child.

Cooking toys for older children may include actual food, and may even include cooking with heat. Toys for younger children, on the other hand, are typically limited to simulating food preparation or kitchen activities with artificial (and inedible) foods in order to minimize the potential for injury and mess. However, even the youngest child understands that pretending to prepare plastic food leaves something to be desired, when compared to preparing something that may be eaten. It would be desirable to have formulations that permit even young children to prepare edible foodstuffs, quickly and easily, and that require minimal equipment and cooking skills.

SUMMARY

Food formulations suitable for preparation by young children, requiring only the addition of water, that produce simulated foods exhibiting substantially appropriate textures and flavors.

DETAILED DESCRIPTION

The food formulations of the disclosure may be used independently, or in conjunction with a food preparation playset. For example, the food preparation playset may include devices that imitate the function of one or more appliances in a kitchen, and may include without limitation a refrigerator, an oven, a range-top cooking surface, cabinets for storage, a blending device, and/or a mixing device. One or more such devices may incorporate water dispensers, lights, timers, air injectors, etc, in any combination.

To facilitate use by even young children, the food formulations of the disclosure may be prepared by adding water and mixing. The formulations may be configured to exhibit changes in appearance, for example to change colors or textures during mixing, or during a 'rest' period after mixing. A particular formulation may be optimized for combination with water at a specified temperature, for example room temperature water, or cold water.

The food formulations may be prepared in any suitable container, in conjunction with a mixing device, or by blending manually. Alternatively, the food formulations may be used in conjunction with a kitchen playset, where the playset is configured to facilitate the preparation of the food formulations by young children. In particular, the kitchen playset may include one or more mixing devices for preparation of the food formulations. For example, a suitable kitchen playset may include one or more of the following: a refrigerator, a water dispenser, an oven, a range-top cooking surface, one or more cabinets for storage, a blender, a mixer, a fondue maker, a milkshake maker, a sorbet maker, and a kitchen timer. An exemplary kitchen playset may also include one or more accessories. Such accessories may include, in any combination, one or more ice packs, baking pans, measuring spoons, mixing bowls, whisks, serving knives, spoons, spatulas, dessert molds, glasses, serving plates, beverage straws, and recipe books.

Where the kitchen playset includes a refrigerator, the refrigerator may be configured to utilize an ice pack or other removable cooling package to effect cooling. Where the cooling package is an ice pack, the ice pack may be filled with water and frozen, and then placed in the refrigerator of the playset.

Where the kitchen playset includes an oven, the oven may include one or more of a light, a timer, or various oven controls. The oven may be provided with controls that actuate the light and/or the timer, or that otherwise enhance the play value of the oven.

Where the kitchen playset includes one or more mixing devices for preparing the food formulations, the mixing devices are typically configured so that the power supply is child-safe, and that any moving parts are non-hazardous. For example, the kitchen playset may include an energized countertop segment that incorporates a motor and power source, such that various mixing devices may be energized by cooperatively interacting with the countertop segment. The mixing devices may simply be placed in contact with the energized countertop segment, or may be positively connected to the countertop segment. The power source for the mixing devices may be external, or may be internal. Typically, the power source is internal, and may include for example one or more batteries. The controls for the mixing device may be associated with the energized countertop segment, and may include an on/off switch or button, or discrete switches or buttons for discrete mixing speeds. The energized countertop segment may include a timing mechanism, such that a mixing device can be activated for a set period of time. For example, the energized countertop segment may be activated by the push of a button, which energizes a cooperatively interacting mixing device for a defined time, after which the mixing device will stop.

A variety of food formulations suitable for preparation using such a playset may be provided with the playset itself, may be provided separately from the playset, or may be available individually. The food formulations are generally prepared so as to facilitate constructive play by children, by permitting them to simulate preparation of a conventional food item in a safe manner. The food formulations are therefore compounded to prepare an edible foodstuff that is representational of a target food item, that is, the resulting edible foodstuff has a texture, a flavor, and/or an appearance substantially appropriate for the target food item desired.

The edible foodstuff may be representational of a target food item that is a beverage or dessert, among other foods. In particular, the food formulations may be used to prepare for example milkshakes, fondue sauces, sorbets, smoothies, brownies, dessert gels, and the like. The food formulations may include any of a variety of sweetening agents, flavorings, acidity regulators, colorings, thickening agents, texture modifiers, and/or other additives.

Sweetening agents may include any of the non-toxic natural or synthetic sweeteners known in the art. Selected natural sweeteners include sucrose, fructose, dextrose, maltose, and maltodextrins, among others. Alternatively, the sweetener may be an amino acid sweetener, such as L-alanine or glycine, an alcohol such as sorbitol, mannitol, or xylitol, or a vegetable extract such as may be obtained from glycyrrhiza glabra (sweet licorice), among others. So-called 'sugar free' beverage compositions may be formulated with synthetic sweeteners, such as saccharin, cyclamate salts, sucralose, and selected dipeptide sweeteners, such as L-aspartyl-L-phenylalanine methyl ester (ASPARTAME), among others. Typically, the sweetening agent includes sugar and/or maltodextrin.

Appropriate flavoring agents may include any of the many non-toxic natural or artificial flavoring agents known in the art. In particular, the flavoring agents used may include one or more of a variety of natural or artificial fruit flavors, including orange, lemon, lime, blueberry, cherry, apply, berry, pineapple, banana, grape, strawberry, watermelon, and kiwi flavorings, among others. Alternatively, or in addition, the flavoring agents may include one or more of natural or artificial vanilla, chocolate, peanut butter, cola, root beer, cream soda, pistachio, honey, marshmallow, butterscotch, and caramel flavorings, among others.

Appropriate acidity regulators may include nontoxic bases, nontoxic acids, or nontoxic buffering agents, or any combination thereof, provided that the resulting food formulation exhibits the desired acidity after preparation. Suitable bases include, but are not limited to, alkali metal or alkaline earth metal carbonates, or alkali metal or alkaline earth metal bicarbonate salts. Suitable edible acids include, but are not limited to, citric acid, malic acid, fumaric acid, ascorbic acid, and/or tartaric acid, among others. Buffering agents may include, but are not limited to, salts such as sodium or potassium citrate, sodium or potassium lactate, sodium monophosphate, disodium phosphate, or dicalcium phosphate, among others.

Appropriate coloring agents may include any of a variety of natural or artificial food colorings that are non-toxic and known in the art, including for example Red no. 2 (amaranth), Red no. 3 (erythrosine), Red no. 4 (Ponceau SX), DC Red no. 22 (eosine), Red no. 28 (phloxine), Red no. 40 (Allura Red; or disodium salt of 6-hydroxy-5[(2-methoxy-5-methyl-4-sulfophenyl) azo]-2-naphthalenesulfonic acid), Yellow no. 5 (tartrazine; trisodium 5-hydroxy-1-(4-sulfonatophenyl) (4-sulfonatophenylazo)-H-pyrazole-3-carboxylate), DC Yellow no. 1 (quinoline yellow SS), Yellow no. 6 (Sunset Yellow FCF; or disodium salt of 6-hydroxy-5-[(4-sulfophenyl)azo]-2-naphthalenesulfonic acid)), DC Yellow no. 10 (Quinoline Yellow WS), Green no. 3 (Fast Green FCF), DC Green no. 5 (Alizarine Cyanine Green F), DC Green no. 6 (Quinizarine Green SS), Blue no. 1 (Brilliant Blue FCF), Blue no. 2 (Indigo Carmine), annatto, anthocyanins, beet extracts, beta-carotene, caramel, carmine/cochineal, paprika oleoresin, and turmeric, among others. It should be apparent that a single component of a food formulation may function as both a coloring agent and a flavoring agent, for example caramel.

Appropriate thickening agents include any edible and nontoxic additive that confers upon the resulting foodstuff the desired texture and/or appearance. Thickening agents may be selected to render the resulting beverage smooth and creamy, or thick and textured. Appropriate thickening agents include, but are not limited to, pectin, starch, gum arabic, locust bean gum, guar gum, carageenan, alginates, sodium carboxymethyl cellulose, gellan gum, and xanthan gum, among others.

The food formulation may be present as a fine or granular composition, that is substantially dry and free-flowing. Typically, an amount of the food formulation sufficient for preparation of one serving of the desired edible foodstuff is packaged in a separate packet or envelope. The packet is generally configured to be openable by a child without undue effort. The food formulation may also include a non-toxic desiccant, such as silicon dioxide, or other anti-caking agent. Additional additives, such as stabilizing agents, vitamins, minerals, antioxidants, and emulsifiers, in any combination, may also be present in the food formulation.

The particular food formulations discussed below may be modified, for example by varying individual ingredients, or by varying the ratio of selected ingredients, without departing from the scope of the present disclosure. Similarly, the preparation of the particular food formulations discussed below may be modified, for example by using warmer or cooler water, by varying selected mixing times, or by altering the mixing order, without departing from the scope of the present disclosure. Selected formulations may be prepared according to the following general procedures.

Exemplary Food Formulation Preparation Procedures

| Formulation Type | Water Temp | Mixing Instructions |
| --- | --- | --- |
| Brownie | Room/Ambient | Add water to dry mix |
| | | Mix until smooth using blender |
| | | Stir in cookie crumbs |
| | | Pour into pan |
| | | Let sit in oven for 3–5 minutes |
| Gel | Room/Ambient | Add water to dry mix |
| | | Mix with whisk for 1 minute |
| | | Pour into gel molds |
| | | Let sit for 3 minutes (in refrigerator or at room temp) |
| Smoothie | Cold | Place water in blender |
| | | Add dry mix |
| | | Mix for 30 sec to 1 minute until smooth |
| | | Pour into serving cups |
| | | Smoothie will continue to thicken for 1–3 minutes |
| Milkshake | Cold | Place water in blender |
| | | Add dry mix |
| | | Mix for 30 sec to 1 minute until smooth |
| | | Pour into serving cups |
| | | Milkshake will continue to thicken for 1–3 minutes |
| Fondue | Room/Ambient | Place water in pan |
| | | Stir/whisk in dry mix |
| | | Mix until smooth or until all dry mix is blended |
| Sorbet | Cold | Place water in mixer |
| | | Add dry mix |
| | | Mix for 30 sec. |
| | | Refrigerate for 3 minutes |

Brownies/Cakes

The brownie formulation may be used to create a cake, or cake-like composition, having a texture and taste similar to a baked product. The formulation does not require heating, and may be prepared by adding water. Typically, a first cake formulation may be combined with water to create an intermediate mixture. An additional composition of pastry crumbs may then be folded into the intermediate mixture in order to help set the texture of the cake. The pastry crumbs may resemble cookie crumbs in flavor and texture. The texture and appearance of the cake may be enhanced by permitting the cake to rest or set. The resulting cake may be frosted, and typically exhibits the flavor and texture of for example a baked brownie. The brownie/cake formulation may include frosting mix, and/or edible sprinkles for decorating the resulting cake.

In particular, the brownie formulation may be prepared using a mixing device. The mixing device, such as a mixer, may be coupled with the energized segment of the countertop. Cold water may then be added to the mixing device. The brownie formulation may be slowly added to the water, and the mixing device may be energized. After the resulting mixture is blended, a dry composition may be added to the mixture, typically by folding. The combined mixture may then be poured into a pan, and smoothed with a spatula. The filled pan may be placed in the oven of the playset, and permitted to set as required. Without wishing to be bound by theory, the addition of dry, cookie-like crumbs to the blended mixture may result in the absorption of moisture by the crumbs, and create a drier, cake-like texture for the brownie. After the brownie has been given sufficient time to consolidate, it may be removed from the oven for icing, if desired.

The brownie food formulation may include icing, so that the resulting brownie may be iced. The icing may be premade icing, or may be an icing composition that is preparable by the addition of water. The icing composition may demonstrate color-changing properties upon preparation. For example, a color-change vanilla frosting mix may be mixed with room temperature water, resulting in a color change from white to pink. Such a frosting formulation may be preparing using a mixing device in conjunction with the kitchen playset.

Exemplary brownie formulation

| Ingredient | % by Weight |
| --- | --- |
| Sugar | 58.68 |
| elatin | 10.53 |
| Cocoa Powder | 7.89 |
| Artificial Chocolate Flavor | 0.53 |
| Modified Food Starch | 10.53 |
| Maltodextrin | 11.84 |
| Total | 100.00 |

A typical serving of the brownie is prepared by adding 2 teaspoons room temperature water to 15 grams of the above dry brownie formulation. To the resulting mixture is added 15 grams of dry cookie crumbs (bleached wheat flour, sugar, cocoa, sunflower oil, salt, and baking soda). The brownie may be permitted to rest for a short period, for example 3 minutes, in order to create a desirable cake-like texture.

Dessert Gels

The gel formulations may be optimized for mixing with cold water or room temperature water. Upon mixing, the resulting mixture may spontaneously thicken and/or gel to create a tasty flavored dessert. In particular, preparation of the dessert gel does not require hot water. Although the thickening of the dessert gel may be enhanced or quickened by cooling in a refrigerator or other cooled enclosure, such cooling is not required.

The gel formulation may be mixed, for example using a whisk or spoon, until dissolved in the water. Alternatively, the gel may be mixed using a mixing device, as described above. The resulting mixture may then be poured into another container or containers, such as a dessert mold. The mixture may then be chilled to enhance 'setting' of the gel. The formulation may include sprinkles, toppings, or mix-in ingredients, for example including candies, cookie crumbs, colored sugar, dried or dehydrated fruit.

Although the dessert gel formulations do not require heating, play value may be enhanced by dissolving the gel formulation in conjunction with the kitchen playset. In particular, the dessert gel formulation may be prepared in a saucepan using a stove-top playset, and then placed in the toy refrigerator to gel.

Exemplary Green Apple Gel formulation.

| Ingredient | % by Weight |
| --- | --- |
| Sugar | 78.75 |
| Sodium Alginate | 9.7500 |
| Citric Acid | 2.9000 |
| Modified Food Starch | 7.2000 |
| Dicalcium Phosphate | 0.4700 |
| Natural & Artificial Green Apple Flavor | 0.2250 |
| Titanium Dioxide | 0.0230 |
| FD&C Yellow #5 | 0.0039 |
| FD&C Blue #1 | 0.00015 |
| Maltodextrin | 0.6809 |
| Total | 100.0000 |

Exemplary Peach Gel formulation.

| Ingredient | % by Weight |
| --- | --- |
| Sugar | 81.850 |
| Sodium Alginate | 7.250 |
| Gum Blend | 0.300 |
| Adipic Acid | 5.250 |
| Sodium Citrate | 2.850 |
| Dicalcium Phosphate | 0.600 |
| Peach Flavor | 1.250 |
| FD&C Yellow #6 | 0.007 |
| Maltodextrin | 0.644 |
| Total | 100.000 |

Alternative Exemplary Peach Gel formulation.

| Ingredient | Formula % by Weight |
| --- | --- |
| Sugar | 83.814 |
| Sodium Alginate | 7.251 |
| Gum Blend | 0.300 |
| Malic Acid | 2.000 |
| Fumaric Acid | 0.400 |
| Citric Acid | 1.200 |
| Sodium Citrate | 2.534 |
| Dicalcium Phosphate | 0.600 |
| Peach Flavor | 1.250 |
| FD&C Yellow #6 | 0.007 |
| Maltodextrin | 0.644 |
| Total | 100.000 |

Additional Alternative Peach Gel formulation.

| Ingredient | Formula % by Weight |
|---|---|
| Sugar | 82.362 |
| Sodium Alginate | 10.250 |
| Gum Blend | 0.711 |
| Malic Acid | 0.317 |
| Fumaric Acid | 0.381 |
| Citric Acid | 1.142 |
| Sodium Citrate | 2.411 |
| Dicalcium Phosphate | 0.571 |
| Peach Flavor | 1.190 |
| FD&C Yellow #6 | 0.006 |
| Maltodextrin | 0.640 |
| Total | 100.000 |

Exemplary Strawberry Gel formulation.

| Ingredient | % by Weight |
|---|---|
| Sugar | 82.200 |
| Sodium Alginate | 7.250 |
| Gum Blend | 0.300 |
| Adipic Acid | 5.250 |
| Sodium Citrate | 2.850 |
| Dicalcium Phosphate | 0.600 |
| Artificial Strawberry Flavor | 1.250 |
| FD&C Red #40 | 0.003 |
| Maltodextrin | 0.297 |
| Total | 100.000 |

Alternative Exemplary Strawberry Gel formulation.

| Ingredient | Formula % by Weight |
|---|---|
| Sugar | 83.895 |
| Sodium Alginate | 7.252 |
| Gum Blend | 0.300 |
| Malic Acid | 2.001 |
| Fumaric Acid | 0.400 |
| Citric Acid | 1.200 |
| Sodium Citrate | 2.534 |
| Dicalcium Phosphate | 0.600 |
| Artificial Strawberry Flavor | 1.517 |
| FD&C Red #40 | 0.003 |
| Maltodextrin | 0.297 |
| Total | 100.000 |

Additional Exemplary Strawberry Gel formulation.

| Ingredient | Formula % by Weight |
|---|---|
| Sugar | 81.902 |
| Sodium Alginate | 10.772 |
| Gum Blend | 0.734 |
| Malic Acid | 0.319 |
| Fumaric Acid | 0.383 |
| Citric Acid | 1.149 |
| Sodium Citrate | 2.426 |
| Dicalcium Phosphate | 0.575 |
| Artificial Strawberry Flavor | 1.452 |
| FD&C Red #40 | 0.003 |
| Maltodextrin | 0.284 |
| Total | 100.000 |

The above exemplary dessert gel formulations may be prepared by adding 3 tablespoons room temperature water to 15 grams of the dry gel mixture.

Additional Alternative Peach Gel Formulations

Formula A: sugar, sodium alginate, malic acid, sodium citrate, natural and artificial flavor, citric acid, gum arabic, maltodextrin, dicalcium phosphate, fumaric acid, cellulose gum, xanthan gum, carrageenan, Yellow #6

Formula B: sugar, sodium alginate, malic acid, sodium citrate, natural and artificial flavor, citric acid, gum arabic, maltodextrin, calcium phosphate dibasic, fumaric acid, cellulose gum, xanthan gum, carrageenan, sunset yellow FCF Formula C: sugar, thickeners (E 401, E 466, E 415, E 407), acidity regulators (E 331 i, E 296, E 330, E 297), flavour, maltodextrin, raising agent (E 34 i), colour (E 110).

Formula D: sugar, sodium alginate, malic acid, sodium citrate, natural and artificial flavour, citric acid, gum arabic, maltodextrin, dicalcium phosphate, fumaric acid, sodium carboxymethyl cellulose, xanthan gum, carrageenan, sunset yellow FCF Formula E:: sugar, thickener (sodium alginate), acidity regulator (malic acid), acidity regulator (sodium citrate), natural and artificial flavour, acidity regulator (citric acid), thickener (gum arabic), maltodextrin, acidity regulator (dicalcium phosphate), acidity regulator (fumaric acid), thickener (sodium carboxymethyl cellulose), thickener (xanthan gum), thickener (carrageenan), colour (sunset yellow FCF)

Additional Alternative Strawberry Gel Formulations

Formula F: Sugar, sodium alginate, malic acid, sodium citrate, artificial flavor, citric acid, maltodextrin, dicalcium phosphate, fumaric acid, cellulose gum, xanthan gum, carrageenan, gum arabic, Red #40

Formula G: Sugar, sodium alginate, malic acid, sodium citrate, artificial flavor, citric acid, maltodextrin, calcium phosphate dibasic, fumaric acid, cellulose gum, xanthan gum, carrageenan, gum arabic, allura red Formula H: sugar, acidity regulators (E 331 i, E 296, E 330, E 297), thickeners (E 401, E 466, E 415, E 407), flavour, raising agent (E 341ii), maltodextrin, colour (E 129).

Formula I: sugar, sodium alginate, malic acid, sodium citrate, artificial flavour, citric acid, maltodextrin, dicalcium phosphate, fumaric acid, sodium carboxymethyl cellulose, xanthan gum, carrageenan, gum arabic, allura red Formula J: sugar, thickener (sodium alginate), acidity regulator (malic acid), acidity regulator (sodium citrate), artificial flavour, acidity regulator (citric acid), maltodextrin, acidity regulator (dicalcium phosphate), acidity regulator (fumaric acid), thickener (sodium carboxymethyl cellulose), thickener (xanthan gum), thickener (carrageenan), thickener (gum arabic), colour (allura red)

Smoothies

The smoothie formulations may be optimized for mixing with cool or cold water. Upon mixing, the resulting beverage may exhibit a color, texture, and flavor similar to a smoothie beverage. In particular, the smoothie may be formulated to resemble a fruit-based smoothie beverage. The smoothie formulation may include a variety of sprinkles, toppings, or mix-in ingredients, for example including candies, colored sugar, and particularly including fruit, such as fresh fruit, dried fruit, or dehydrated fruit.

In particular, the smoothie beverage may be prepared using a mixing device. The mixing device, such as a blender, may be coupled with the energized segment of the countertop. Cold water may be added to the blender, and the blender energized. As the blender is operating, the smoothie formulation may be added to the water. The resulting mixture may be stirred until thoroughly blended and ready for drinking. The resulting beverage may be relatively thin in texture, or have a thicker texture, but typically has a texture suitable for consumption using a straw. The smoothie beverage may be at least somewhat frothy in texture and/or appearance.

Exemplary Banana Smoothie formulation.

| Ingredient | % by Weight |
| --- | --- |
| Sugar | 82.467 |
| Lactic Acid | 1.333 |
| Gum Blend | 2.533 |
| Sodium Alginate | 1.267 |
| Non Dairy Creamer | 5.000 |
| Artificial Whip Cream Flavor | 0.667 |
| Artificial Banana Flavor | 0.667 |
| Beta Carotene (1% w/w) | 0.053 |
| Maltodextrin | 6.013 |
| Total | 100.000 |

Exemplary Banana Smoothie formulation.

| Ingredient | Formula % by Weight |
| --- | --- |
| Sugar | 85.800 |
| Lactic Acid | 1.333 |
| Gum Blend | 2.533 |
| Sodium Alginate | 1.267 |
| Non Dairy Creamer | 1.667 |
| Artificial Whip Cream Flavor | 0.667 |
| Artificial Banana Flavor | 0.667 |
| Beta Carotene (1% w/w) | 0.053 |
| Maltodextrin | 6.013 |
| Total | 100.000 |

Exemplary Blueberry Smoothie formulation.

| Ingredient | % by Weight |
| --- | --- |
| Sugar | 82.466 |
| Citric Acid | 0.267 |
| Lactic Acid | 1.333 |
| Gum Blend | 2.533 |
| Sodium Alginate | 1.267 |
| Rich Mix | 5.000 |
| Artificial Whip Cream Flavor | 0.667 |
| Artificial Blueberry Flavor | 0.133 |
| Red Cabbage Powder | 0.200 |
| FD&C Blue #1 | 0.0013 |
| Maltodextrin | 6.133 |
| Total | 100.000 |

Exemplary Blueberry Smoothie formulation.

| Ingredient | Formula % by Weight |
| --- | --- |
| Sugar | 85.466 |
| Citric Acid | 0.267 |
| Lactic Acid | 1.333 |
| Gum Blend | 2.533 |
| Sodium Alginate | 1.267 |
| Non Dairy Creamer | 2.000 |
| Artificial Whip Cream Flavor | 0.667 |
| Artificial Blueberry Flavor | 0.133 |
| Red Cabbage Powder | 0.200 |
| FD&C Blue #1 | 0.0013 |
| Maltodextrin | 6.133 |
| Total | 100.000 |

The above exemplary smoothie beverage formulations are typically prepared by adding 15 grams of the dry smoothie mixture to 4 tablespoons cold water, with mixing.

Additional Alternative Banana Smoothie Formulations

Formula K: Sugar, maltodextrin, non-dairy creamer (sunflower oil, corn syrup solids, sodium caseinate (a milk derivative), mono-and diglycerides, dipotassium phosphate, sodium silicoaluminate, soy lecithin), modified food starch, artificial flavor, sodium alginate, cellulose gum, xanthan gum, carrageenan, lactic acid, beta carotene for color Formula L: Sugar, maltodextrin, non-dairy creamer (sunflower oil, corn syrup solids, sodium caseinate (a milk derivative), mono-and diglycerides, potassium phosphate dibasic, sodium silicoaluminate, soy lecithin), modified corn starch, artificial flavor, sodium alginate, cellulose gum, xanthan gum, carrageenan, lactic acid, carotene Formula M: sugar, maltodextrin, thickeners (E 401, E 466, E 415, E 407), flavours, modified maize starch, sunflower oil, corn syrup solids, acid (E 270), milk proteins, emulsifiers (E 322, E 471), acidity regulator (E 340ii), colour (E 160a(ii)), anticaking agent (E 554)

Formula N: sugar, maltodextrin, non-dairy creamer (sunflower oil, corn syrup solids, sodium caseinate (a milk derivative), mono-and diglycerides, dipotassium phosphate, sodium aluminosilicate, soy lecithin), modified food starch, artificial flavour, sodium alginate, sodium carboxymethyl cellulose, xanthan gum, carrageenan, lactic acid, beta carotene Formula O: sugar, maltodextrin, non-dairy creamer (sunflower oil, corn syrup solids, sodium caseinate (a milk derivative), stabilizer (mono-and diglycerides), acidity regulator (dipotassium phosphate), anticaking agent (sodium aluminosilicate), emulsifier (soy lecithin)), modified food starch, artificial flavour, thickener (sodium alginate), thickener (sodium carboxymethyl cellulose), thickener (xanthan gum), thickener (carrageenan), acidity regulator (lactic acid), colour (beta carotene)

Additional Alternative Blueberry Smoothie Formulations

Formula P: Sugar, maltodextrin, non-dairy creamer (sunflower oil, corn syrup solids, sodium caseinate (a milk derivative), mono-and diglycerides, dipotassium phosphate, sodium silicoaluminate, soy lecithin), sodium alginate, modified food starch, natural and artificial flavor, cellulose gum, xanthan gum, carrageenan, citric acid, lactic acid, red cabbage juice for color, gum arabic, Blue #1

Formula Q: Sugar, maltodextrin, non-dairy creamer (sunflower oil, corn syrup solids, sodium caseinate (a milk derivative), mono-and diglycerides, potassium phosphate dibasic, sodium silicoaluminate, soy lecithin), sodium alginate, modified corn starch, natural and artificial flavor, cellulose gum, xanthan gum, carrageenan, citric acid, lactic acid, dried red cabbage juice, gum arabic, brilliant blue FCF Formula R: sugar, maltodextrin, thickeners (E 401, E 466, E 415, E 407), modified maize starch, sunflower oil, flavours, corn syrup solids, acid (E 270), acidity regulator (E 330, E 340ii), milk proteins, emulsifiers (E 322, E 471), colours (E 163, E 133), anticaking agent (E 554).

Formula S: sugar, maltodextrin, non-dairy creamer (sunflower oil, corn syrup solids, sodium caseinate (a milk derivative), mono-and diglycerides, dipotassium phosphate, sodium aluminosilicate, soy lecithin), sodium alginate, modified food starch, natural and artificial flavour, sodium carboxymethyl cellulose, xanthan gum, carrageenan, citric acid, lactic acid, anthocyanin, gum arabic, brilliant blue FCF Formula T: sugar, maltodextrin, non-dairy creamer (sunflower oil, corn syrup solids, sodium caseinate (a milk derivative), stabilizer (mono-and diglycerides), acidity regulator (dipotassium phosphate), anticaking agent (sodium aluminosilicate), emulsifier (soy lecithin)), thickener (sodium alginate), modified food starch, natural and artificial flavour, thickener (sodium carboxymethyl cellulose), thickener (xanthan gum), thickener (carrageenan), acidity regulator (citric acid), acidity regulator (lactic acid), thickener (gum arabic), colours (anthocyanin, brilliant blue FCF)

Milkshake Formulations

The milkshake formulations may be optimized for mixing with cool or cold water. In particular, the milkshake formulations may be prepared using a mixing device. The mixing device may be configured to resemble a conventional milkshake maker, a blender, a drink mixer, or any other suitable mixing device. Where the mixing device resembles a milkshake maker, the milkshake maker may include accessories and components including, among others, the mixer itself, a mixing cup, one or more serving glasses, straws, a straw holder, and the like.

The milkshake maker may be coupled with the energized segment of the countertop. Cold water may be added to the mixing cup, and the milkshake maker may be energized. A desired milkshake formulation may be slowly added to the mixing cup, and the resulting mixture blended until the desired consistency is achieved. Typically a thickened texture is desired, so as to resemble a conventional milkshake beverage. The milkshake formulation may therefore include one or more components that, upon mixing with water, create a suitable milkshake texture. For example, the components of the milkshake formulation may be selected so as to thicken the solution, or to form granules or particles to enhance the texture of the solution. A suitable formulation may include, for example, sodium alginate and an edible calcium salt, such that upon the addition of water, calcium alginate is formed, and a thickened, milkshake-like texture results without the addition of, for example, ice cream.

After the milkshake beverage is prepared, a variety of 'mix-in' ingredients may be added to the milkshake beverage, for example including candies, syrups, granola, fruit, dried fruit, dehydrated fruit, among others. In a particular formulation, the mix-in ingredients include dried fruit and marshmallow candies.

Exemplary Chocolate Milkshake formulation.

| Ingredient | % by Weight |
| --- | --- |
| Sugar | 78.233 |
| Cellulose Gum | 1.262 |
| Non Fat Dry Milk, low heat | 6.309 |
| NonDairy Creamer | 6.309 |
| Calcium Lactate | 0.631 |
| Titanium Dioxide | 0.000 |
| Artificial Vanilla Flavor | 1.893 |
| Gum Arabic | 1.262 |
| Sodium Alginate | 1.893 |
| Cocoa Powder | 1.262 |
| Natural & Artificial Chocolate Fudge Flavor | 0.631 |
| Natural & Artificial Chocolate Fudge Flavor | 0.315 |
| Total | 100.000 |

Exemplary Peanut Butter Milkshake formulation.

| Ingredient | % by Weight |
| --- | --- |
| Sugar | 78.794 |
| Cellulose Gum | 1.270 |
| Non Fat Dry Milk, low heat | 6.349 |
| NonDairy Creamer | 6.349 |
| Calcium Lactate | 0.635 |
| Artificial Vanilla Flavor | 1.905 |
| Gum Arabic | 1.270 |
| Sodium Alginate | 1.905 |
| Artificial Peanut Butter Flavor | 1.079 |
| Salt | 0.190 |
| Caramel Color | 0.254 |
| Total | 100.000 |

Exemplary Strawberry Milkshake formulation.

| Ingredient | % by Weight |
| --- | --- |
| Sugar | 78.648 |
| Cellulose Gum | 1.263 |
| Non Fat Dry Milk, low heat | 6.317 |
| NonDairy Creamer | 6.317 |
| Calcium Lactate | 0.632 |
| Titanium Dioxide | 0.000 |
| Artificial Vanilla Flavor | 1.895 |
| Gum Arabic | 1.263 |
| Sodium Alginate | 1.895 |
| Strawberry Flavor, NI | 1.263 |
| FD&C Red #40 | 0.002 |
| Maltodextrin | 0.188 |
| Citric Acid | 0.316 |
| Total | 100.000 |

Exemplary Vanilla Milkshake formulation.

| Ingredient | % by Weight |
| --- | --- |
| Sugar | 79.61 |
| Cellulose Gum | 1.29 |
| Non Fat Dry Milk, low heat | 6.45 |
| NonDairy Creamer | 6.45 |
| Calcium Lactate | 0.65 |
| Titanium Dioxide | 0.19 |
| Artificial Vanilla Flavor | 1.94 |
| Gum Arabic | 1.29 |
| Sodium Alginate | 1.94 |
| Artificial Malt Flavor | 0.19 |
| Total | 100.000 |

The milkshake formulations may be prepared as described above, using 15 grams of the dry mixture with 3 Tbsp cold water.

Fondue

The fondue formulations may be optimized for mixing with warm or room temperature water. In particular, the fondue formulations, when mixed with water, may create an edible fondue mixture having a thickened consistency suitable for coating dipped objects, without requiring the use of hot water, or heating of the mixture, and thereby remaining safe for small children.

The fondue mixture may be prepared using a mixing bowl or mixing device. Room-temperature water may be added to the bowl, following by the slow addition of the fondue formulation. The resulting mixture may be slowly mixed using a spoon, such as a slotted spoon. Alternatively, or in addition, the fondue mixture may be prepared using a mixing device. The mixing device may be configured to resemble a conventional "fondue pot", or any other suitable mixing device. Where the mixing device resembles a fondue pot, the fondue pot may be constructed so that when energized by coupling to the energizing countertop, the fondue mixture is stirred. Alternatively, or in addition, the fondue pot may simulate the bubbling or simmering of the fondue mixture, without requiring heating. The fondue pot may further include, for example, a fondue pot cover, a fondue pot stand, a mixing spoon, one or more skewers for dipping, serving plates, and the like.

The fondue formulation may include, packed separately or together, a variety of edible objects for dipping in the resulting fondue mixture, for example, candies, fruit, dried fruit, dehydrated fruit, etc. In particular, the fondue formulation may include marshmallow candies, or edible gelatin candies ('gummy' candies). The gelatin candies may be provided in a variety of entertaining or amusing shapes, including flowers or animal shapes.

Exemplary Chocolate Fondue formulation.

| Ingredient | % by Weight |
| --- | --- |
| Sugar | 72.290 |
| Cocoa Powder | 12.050 |
| Modified Food Starch | 4.820 |
| Non Fat Dry Milk | 9.640 |
| Gum Guar Bland | 1.200 |
| Total | 100.000 |

Exemplary Raspberry Fondue formulation.

| Ingredient | % by Weight |
| --- | --- |
| Sugar | 75.3000 |
| Non Fat Dry Milk Powder | 15.0600 |
| Modified Food Starch | 6.5300 |
| Guar Gum | 1.7600 |
| Citric Acid | 0.7500 |
| Artificial Raspberry Flavor | 0.1000 |
| FD&C Red #40 | 0.0048 |
| FD&C Blue #1 | 0.0002 |
| Maltodextrin | 0.4950 |
| Total | 100.0000 |

Exemplary White Chocolate Fondue formulation.

| Ingredient | % by Weight |
| --- | --- |
| Sugar | 75.880 |
| Non Fat Dry Milk Powder | 15.210 |
| Modified Food Starch | 6.590 |
| Guar Gum | 1.770 |
| Natural & Artificial Chocolate Flavor | 0.250 |
| Artificial Vanilla Flavor | 0.250 |
| Titanium Dioxide | 0.050 |
| Total | 100.000 |

The above fondue formulations may be prepared by combining 2 teaspoons room temperature water to 15 grams of the dry fondue formulation.

Sorbet

The sorbet formulation may be optimized for mixing with cool or cold water. The sorbet formulation is Upon mixing, the formulation may spontaneously thicken and/or gel to create a foodstuff having a texture and appearance similar to a frozen sorbet-type dessert. The resulting mixture may be chilled, for example in an actual working refrigerator, or in a chilled cooler, or chilled toy refrigerator, in order to further enhance the appearance of the sorbet-type dessert.

The sorbet mixture may be prepared in a mixing device, such as a sorbet maker, configured to include a reservoir of liquid. The reservoir of liquid may be pre-chilled before preparing the sorbet, in order to enhance the preparation of the sorbet-type dessert. The chillable liquid may be water, in order to ensure the safety of a child operator. The chillable reservoir may be contained within the walls of a container for the sorbet mixture, such that the sorbet mixture is chilled, or freezes, when in contact with the walls of the container. The sorbet maker may be further configured to include a blade that scrapes the internal walls of the container as the sorbet mixture freezes, to create a smooth-textured frozen treat.

To create sorbet mixtures using the sorbet maker, the chillable liquid reservoir may be placed in a freezer until cold or frozen. When sufficiently cold, the reservoir may be inserted into the sorbet maker, and the sorbet maker may then be coupled to the energizing countertop of the kitchen playset. Cold water may be added to the container, followed by addition of the sorbet formulation. The lid of the sorbet maker, which includes the blade for scraping the internal walls of the container, may then be attached, and the sorbet maker energized.

After sufficient mixing time, for example 30 seconds to a minute, the container may be removed from the sorbet maker and placed in the freezer for several minutes, or until the sorbet dessert reaches the desired texture. The resulting sorbet dessert may be served in a dish, or served in an edible container, such as a sugar or wafer cone. The sorbet dessert may include a variety of sprinkles, toppings, or mix-in ingredients, for example including candies, cookie crumbs, colored sugar, dried or dehydrated fruit.

Exemplary Banana Sorbet formulation.

| Ingredient | % by Weight |
| --- | --- |
| Sugar | 83.741 |
| Sodium Alginate | 5.740 |
| Citric Acid | 1.913 |
| Modified Food Starch | 7.652 |

-continued

| Ingredient | % by Weight |
| --- | --- |
| Dicalcium Phosphate | 0.382 |
| Artificial Banana Flavor | 0.239 |
| Titanium Dioxide | 0.143 |
| FD&C Yellow #5 | 0.002 |
| Maltodextrin | 0.188 |
| Total | 100.000 |

Exemplary Blueberry Sorbet formulation.

| Ingredient | % by Weight |
| --- | --- |
| Sugar | 78.864 |
| Sodium Alginate | 7.314 |
| Citric Acid | 2.925 |
| Dicalcium Phosphate | 0.488 |
| Artificial Blueberry Flavor | 0.098 |
| FD&C Red #40 | 0.0030 |
| FD&C Blue #1 | 0.0015 |
| Maltodextrin | 0.434 |
| Natural Mint Flavor | 0.024 |
| Modified Food Starch | 9.751 |
| Titanium Dioxide | 0.098 |
| Total | 100.000 |

Exemplary Watermelon Sorbet formulation.

| Ingredient | % by Weight |
| --- | --- |
| Sugar | 79.885 |
| Sodium Alginate | 7.050 |
| Citric Acid | 2.820 |
| Modified Food Starch | 9.400 |
| Dicalcium Phosphate | 0.470 |
| Natural & Artificial Watermelon Flavor | 0.023 |
| Artificial Watermelon Flavor | 0.094 |
| FD & C Red #40 | 0.002 |
| Maltodextrin | 0.233 |
| Titanium Dioxide | 0.023 |
| Total | 100.000 |

The above exemplary sorbet formulations may be prepared by adding 15 grams of the dry sorbet mixture to 3 tablespoons cold water.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances.

What is claimed is:

1. A food formulation for the child-safe preparation of an edible foodstuff that is representational of a target food item that is a milkshake, smoothie beverage, fondue, or sorbet, where the edible foodstuff is preparable by the addition of water at or below room temperature to the food formulation without heating, the edible foodstuff having a texture and a flavor appropriate for the target food item, and where the food formulation includes 82–86% sugar, 1–2% lactic acid, 0–1% citric acid, 2–3% gum blend, 1–2% sodium alginate, 1–5% nondairy creamer, and 5–7% maltodextrin;

or

78–80% sugar, 1.2–1.3% cellulose gum, 6–7% nonfat dry milk, 6–7% nondairy creamer, 0.6–0.7% calcium lactate, 1.2–1.3% gum arabic, and 1.8–2.0% sodium alginate;

or

75–76% sugar, 15–16% nonfat dry milk powder, 6–7% modified food starch, 1–2% guar gum, and 0–0.5% maltodextrin;

or

79–84% sugar, 5–7% sodium alginate, 1–3% citric acid, 7–10% modified food starch, 0.4–0.5% dicalcium phosphate, and 0.1–0.4% maltodextrin;

and optionally further includes natural or artificial flavors and/or colors.

2. The food formulation of claim 1, wherein the edible foodstuff has an appearance that is appropriate for the target food item.

3. The food formulation of claim 1, wherein the food formulation is provided in at least one sealed packet.

4. The food formulation of claim 1, wherein the food formulation includes a topping for application to the edible foodstuff.

5. The food formulation of claim 4, wherein the topping includes candy or sugar sprinkles.

6. The food formulation of claim 1, wherein the target food item is a milkshake or a smoothie beverage having a composition that includes:

82–86% sugar, 1–2% lactic acid, 0–1% citric acid, 2–3% gum blend, 1–2% sodium alginate, 1–5% nondairy creamer, and 5–7% maltodextrin;

or

78–80% sugar, 1.2–1.3% cellulose gum, 6–7% nonfat dry milk, 6–7% nondairy creamer, 0.6–0.7% calcium lactate, 1.2–1.3% gum arabic, and 1.8–2.0% sodium alginate;

and optionally further includes natural or artificial flavors and/or colors.

7. The food formulation of claim 6, wherein the food formulation includes a mix-in ingredient, and the preparation of the edible foodstuff includes the addition of the mix-in ingredient.

8. The food formulation of claim 7, wherein the mix-in ingredient is selected from candies, syrups, granola, fruit, dried fruit, and dehydrated fruit.

9. The food formulation of claim 1, wherein the target food item is a fondue having a composition that includes:

75–76% sugar, 15–16% nonfat dry milk powder, 6–7% modified food starch 1–2% guar gum, and 0–0.5% maltodextrin, and optionally further includes natural or artificial flavors and/or colors.

10. The food formulation of claim 9, wherein the food formulation includes dippable ingredients for dipping in the edible foodstuff.

11. The food formulation of claim 10, where the dippable ingredients include at least one of marshmallow candies and edible gelatin candies.

12. The food formulation of claim 1, wherein the target food item is a milkshake having a composition that includes:

1.2–1.3% cellulose gum, 6–7% nonfat dry milk, 6–7% nondairy creamer, 0.6–0.7% calcium lactate, 1.2–1.3% gum arabic, and 1.8–2.0% sodium alginate, and optionally further includes natural or artificial flavors and/or colors.

13. A food formulation as claimed in claim 1, where preparation of the edible foodstuff facilitates constructive play by simulating preparation of the target food item.

14. The food formulation of claim 13, wherein the food formulation includes at least one of a topping or mix-in ingredient for application to or mixing into the edible foodstuff.

15. The food formulation of claim 14, wherein the topping or mix-in ingredient includes at least one of candies, sugar, fruits, dried fruits, or dehydrated fruits.

16. The food formulation of claim 13, wherein the target food item is a milkshake or a smoothie beverage, the food formulation having a composition that includes:

82–86% sugar, 1–2% lactic acid, 0–1% citric acid, 2–3% gum blend, 1–2% sodium alginate, 1–5% nondairy creamer, and 5–7% maltodextrin;

or 78–80% sugar, 1.2–1.3% cellulose gum, 6–7% nonfat dry milk, 6–7% nondairy creamer, 0.6–0.7% calcium lactate, 1.2–1.3% gum arabic, and 1.8–2.0% sodium alginate;

and optionally further includes natural or artificial flavors and/or colors.

17. The food formulation of claim 13, wherein the target food item is a fondue, the food formulation having a composition that includes 75–76% sugar, 15–16% nonfat dry milk powder, 6–7% modified food starch, 1–2% guar gum, 0–0.5% maltodextrin, and optionally includes natural or artificial flavors and/or colors, and includes dippable ingredients for dipping in the edible foodstuff.

18. The food formulation of claim 13, wherein the target food item is a milkshake, the food formulation having a composition that includes 1.2–1.3% cellulose gum, 6–7% nonfat dry milk, 6–7% nondairy creamer, 0.6–0.7% calcium lactate, 1.2–1.3% gum arabic, 1.8–2.0% sodium alginate, and optionally further includes natural or artificial flavors and/or colors.

* * * * *